US007512451B2

(12) United States Patent
Detzler et al.

(10) Patent No.: US 7,512,451 B2
(45) Date of Patent: Mar. 31, 2009

(54) SYSTEM AND METHOD FOR INTERACTIVE PROCESS MANAGEMENT

(75) Inventors: Wayne E. Detzler, Hopkins, MN (US); Mickey K. Tomlinson, Phoenix, AZ (US); Curtis B. Overall, Phoenix, AZ (US); Michael F. Murphy, Mesa, AZ (US); Sandra Pearson, Phoenix, AZ (US); Robert D. Gilmore, Peoria, AZ (US); Philip B. Vaughan, Rushlake Green (GB)

(73) Assignee: American Express Travel Related Services Company, Inc., New York, NY (US)

( * ) Notice: Subject to any disclaimer, the term of this patent is extended or adjusted under 35 U.S.C. 154(b) by 511 days.

(21) Appl. No.: 11/231,257

(22) Filed: Sep. 20, 2005

(65) Prior Publication Data
US 2007/0179642 A1 Aug. 2, 2007

Related U.S. Application Data

(60) Provisional application No. 60/669,644, filed on Apr. 9, 2005.

(51) Int. Cl.
*G05B 13/02* (2006.01)
(52) U.S. Cl. ...................................... 700/29
(58) Field of Classification Search .................. 700/29, 700/31, 32, 36, 51, 83
See application file for complete search history.

(56) References Cited

U.S. PATENT DOCUMENTS

| 6,647,420 | B2 * | 11/2003 | Hellbusch et al. | 709/226 |
| 6,817,008 | B2 | 11/2004 | Ledford et al. | 715/234 |
| 6,952,688 | B1 * | 10/2005 | Goldman et al. | 706/45 |
| 2003/0187743 | A1 * | 10/2003 | Kumaran et al. | 705/26 |
| 2006/0143611 | A1 * | 6/2006 | Sadiq | 718/100 |
| 2007/0179828 | A1 * | 8/2007 | Elkin et al. | 705/8 |

OTHER PUBLICATIONS

"Sarbanes-Oxley Pro: A Process-Driven Path to Compliance," A Proforma White Paper, Proforma Corporation, 2004.
"Model Driven Six Sigma—Using ProVision's Modelers and Simulation Capabilities," Proforma Corporation, 2003.
"Executive Briefing—Creating a sustainable, cost effective solution for Sarbanes-Oxley," Proforma Corporation.
"Business Process Improvement—Manage Process Change using the Pro-Vision™ Model Suite," Technical White Paper, Proforma Corporation, 2002-2003.

* cited by examiner

*Primary Examiner*—Albert DeCady
*Assistant Examiner*—Chad Rapp
(74) *Attorney, Agent, or Firm*—Fitzpatrick, Cella, Harper & Scinto

(57) ABSTRACT

A system, method and computer program product are provided for supplying information relating to the hierarchical structure of a plurality of process models. A storage unit stores process controls for process models. A processor associates the process controls with corresponding ones of the process controls. A media file creator creates a media file which depicts, at the direction of a user, relational linkages of the process models based on the association of the process controls.

15 Claims, 8 Drawing Sheets

SYSTEM AND METHOD FOR INTERACTIVE PROCESS MANAGEMENT

CROSS REFERENCE TO RELATED APPLICATIONS

This application claim priority to, and the benefit of, U.S. Provisional Patent Application Ser. No. 60/669,644 filed Apr. 9, 2005 which is hereby incorporated by reference in its entirety.

BACKGROUND OF THE INVENTION

1. Field of the Invention

This invention generally relates to software applications, and more particularly, to a system and method for interactive process management.

2. Related Art

Business models give the organization a common focus, help create the core processes that drive new business opportunities, and serve as a common language between business and technology experts. These processes define an organization's ability to execute its business plans and optimize its operations.

Heretofor, business process-modeling and process linkage tools and techniques have attempted to provide both a blueprint for analyzing how processes are related and executed as well as a road map for creating the most efficient processes for new business initiatives. However, process knowledge has not been disseminated in a user friendly fashion that is cost effective to maintain current, particularly with respect to processes that are not static, but dynamic in nature. As process information is collected, typically textual documents, graphic presentations, line of visibility process models, and chevron diagrams that articulate graphically processes, process relations, linkages and process scorecards and related process performance measurements for each of the processes are created. Preparing, maintaining and updating such a growing body of process information requires considerable resource allocation cost to a company.

Using conventional applications, displaying the process linkages in a world map format becomes more challenging as more is learned and added to the world map because the mass of interconnecting lines and linkage descriptions reduces readability. Most solutions segment the information into separate pieces. In addition, conventional mapping solutions can present only a step-by-step accounting of what occurs in the process.

Conventional process modeling tools are drawing tools such as Visio, PowerPoint and Proforma Provision. These tools let users diagram business processes and information systems. However, such drawing tools can address only a finite list of the many existing activities and new processes. Preparing process linkages documentation and keeping the documentation updated as additional information is learned takes a significant number of resources.

In addition, compliance with the requirements of new laws, such as the Sarbanes-Oxley Act, particularly for documentation of financial processes and internal controls that pass external auditors' scrutiny, has resulted in significant increases in expenditures for external audit, legal and consulting fees, not to mention the increase in man-hours for already overburdened financial staffs.

Given the foregoing, what is needed is a system, method and computer program product for interactive process management that can provide an end-to-end solution for depicting the full breadth of data related to processes and provides a set of functions supporting the definition of related process steps and the management of the execution across a variety of hardware and software platforms.

BRIEF DESCRIPTION OF THE INVENTION

It is an object of the present invention to provide a business modeling tool which aids strategic business and technology planning, and supports both reengineering and application development efforts by forming a body of knowledge that can be used to educate staff and outsource resources on how the work that they do relates to other processes.

It is an object of the present invention to reduce the time and expense to document financial processes and controls, while improving the overall quality and accessibility of the documentation for future maintenance and audits.

It is also an object of the present invention to provide an analysis tool that aids in improving and/or streamlining business processes by providing a heightened intelligence.

It is also an object of the present invention to provide a tool which aids in pinpointing current process problems, and verifying the expected level of performance of existing and redesigned processes.

It is also an object of the present invention to provide a tool which shows process indicators and linkages in real time.

It is also an object of the invention to provide a graphic depiction of process linkages including a "world map" of linkages, depicting in a single graphic presentation the web of linkages that exist between processes.

It is also an object of the invention to increases the efficiency and turnaround time for metric reporting and system improvement.

In one aspect of the invention, information relating to the hierarchical structure of a plurality of process models is supplied. A storage unit stores process controls for process models. A processor associates the process controls with corresponding ones of the process controls. A media file creator creates a media file which depicts, at the direction of a user, relational linkages of the process models based on the association of the process controls.

Further features and advantages of the present invention as well as the structure and operation of various embodiments of the present invention are described in detail below with reference to the accompanying drawings.

BRIEF DESCRIPTION OF THE DRAWINGS

The features and advantages of the present invention will become more apparent from the detailed description set forth below when taken in conjunction with the drawings.

DETAILED DESCRIPTION

I. Overview

Figure 1:
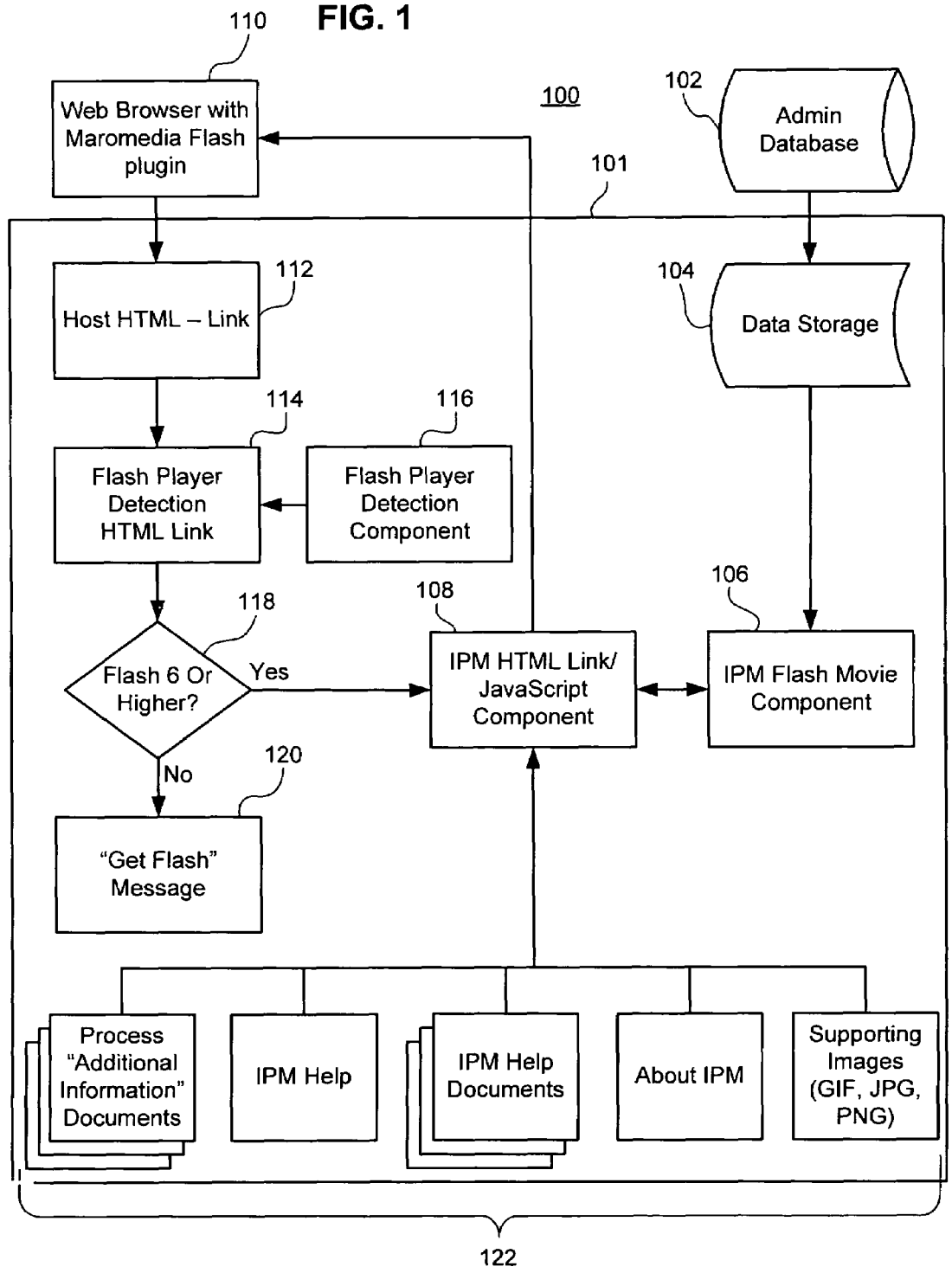
FIG. 1 is an architectural diagram of an exemplary computer system useful for implementing the present invention.

The present invention is directed to a system, method and computer program product for interactive process management.

Generally, the present invention validates and updates process definitions as necessary and creates high level line of visibility maps depicting interrelationships, narrative and graphic depictions of any number of processes, process linkages and interrelationships. The present invention also provides a graphic depiction of process linkages in the form of a world map of linkages, depicted in a single graphic presentation the web of linkages that exist between processes. Depicting process processes and linkages in such an end-to-end fashion allows leading or proactive metrics to be more easily identified and understood and has number of significant advantages over the traditional, segmented view.

Sarbanes-Oxley requires that the organization maintain accurate process models for financial and technical services. The present invention allows business to exceed the compliance and regulatory requirements for Sarbanes-Oxley by providing the ability to quickly view complex end-to-end process models, saving time and resources. In so doing, the present invention educates process owners, stewards, and general staff on how their process interacts and effects other processes in the organization, breaking down process "silos".

The present invention is now described in more detail herein in terms of an exemplary system, method and computer program product for interactive process management for use in an open architecture. This is for convenience only and is not intended to limit the application of the present invention. In fact, after reading the following description, it will be apparent to one skilled in the relevant art(s) how to implement the following invention in alternative embodiments (e.g., closed or proprietary architectures).

The term "user", "end user", "approver", and/or the plural form of these terms are used interchangeably throughout herein to refer to those persons or entities capable of accessing, using, being affected by and/or benefiting from the tool that the present invention provides for interactive process management.

Furthermore, the terms "business" or "merchant" may be used interchangeably with each other and shall mean any person, entity, distributor system, software and/or hardware that is a provider, broker and/or any other entity in the distribution chain of goods or services. For example, a merchant may be a grocery store, a retail store, a travel agency, a service provider, an on-line merchant or the like.

Databases discussed herein may be any type of database, such as relational, hierarchical, graphical, object-oriented, or other database configurations. This includes, but is not limited to, support of well known databases such as Microsoft Access, MySQL, Microsoft SQL, Foxpro, Lotus Notes, Excel, Oracle, DB2, and the like. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art, thus allowing the present invention to be data source independent.

II. System

Referring to FIG. 1, a system diagram of an exemplary interactive process management system 100 in which the present invention, in an embodiment, would be implemented, is shown. In one embodiment, system 100 is implemented using an open architecture allowing flexibility in access and scalability.

System 100 includes a Hypertext Transfer Protocol ("HTTP") server 101, a Web browser 110 for viewing Web pages linked to through HTTP server 101, and an administration database 102. As depicted in FIG. 1, Web browser 110 and administration database 102 are external to HTTP server 101. Application components are placed on HTTP server 101 in a Web server production environment and data is managed and implemented via the HTTP server's application (e.g., Domino Server V 5.0.12). This architecture lends itself to any client server relational database architecture and server implementation and thus can operate within an enterprise's current configuration. It should be understood, however, that the present invention is not limited to the embodiment described herein, which illustrates one possible infrastructure configuration.

Figure 4:
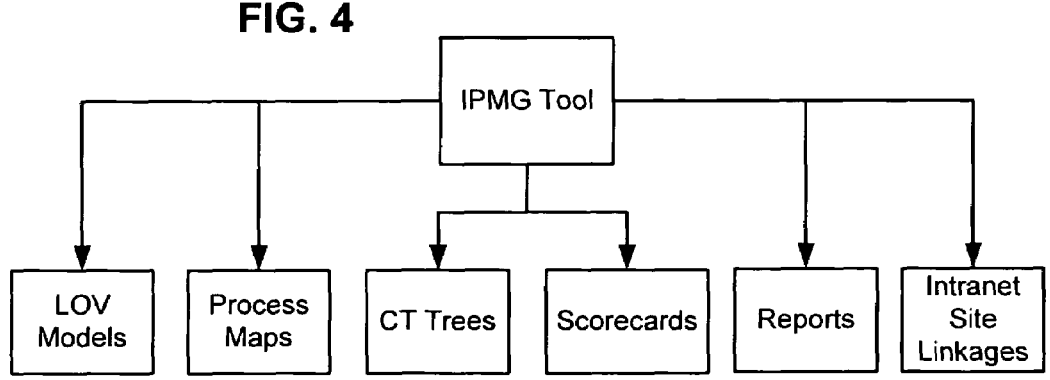
FIG. 4 is a block diagram depicting several application specific process controls capable of being viewed through a graphical interface according to one embodiment of the present invention.

Web browser 110 makes use of HTTP to request information from HTTP server 101 and provide an end user with the ability to display and interact with files hosted on or through HTTP server 101. Each file includes a process control which provides information relating to a process model. FIG. 4 shows several exemplary process controls. For Six Sigma modeling, for example, HTTP server 101 provides a portal to document files such as diagrams showing process, linkages, workflows, roles and activities. Process controls also provide process relationship information in a linear "swimlane" format.

More particularly, the process controls include diagrams in the form of LOV (line of visibility) charts, process maps, business process maps, Critical to Quality ("CT") trees, scorecards, or process reports, and the like. Information also can be linked through intranet site linkages. The files are provided using conventional programs such as Microsoft Visio, PowerPoint or Proforma Provision and can be stored in Microsoft Excel, HTML, Adobe PDF, Word or other formats.

As processes evolve in line with the business, they are visually represented end-to-end horizontally across the company and vertically from the highest expression of business strategy to the most intricate details of process execution.

Web browser 110 also includes a plug-in for viewing media files. In particular, Web browser 110 is configured with Macromedia's Flash player plug-in as a user interface to display information in the form of a Macromedia Flash file. The Flash file delivers graphics and animations based on data fed from various databases.

Web browser 110 is connected to HTTP server 101 by linking to the server's host HTML link 112, which is a URL link to the interactive process management tool in accordance with the present invention. After a connection has been established, a determination is made whether Web browser 110 has Macromedia Flash media player software installed for viewing Flash files. This is handled by further linking Web browser 110 to a Flash player detection HTML link 114. Flash player detection component 116 is initiated upon connection to Flash player detection HTML link 114 to detect whether the correct version of Macromedia's Flash component is loaded onto Web browser 110. If routine 118 on HTTP server 101 determines that the correct Flash player is not loaded onto Web browser 110, then routine 120 displays another Web page on Web browser 110 through HTTP server 101 directing the user on how to obtain the appropriate media player.

If HTTP server 101 routine 118 determines that the correct media player is installed on Web browser 110, then the browser is linked to another HTML link herein referred to as Interactive Process Management ("IPM") HTML link 108. IPM HTML link 108 initiates a JavaScript component which displays the Flash media file created based from data stored in data storage 104. The Flash file interfaces and displays information to a user in accordance with the present invention, which as mentioned above is sourced through administration database 102.

In addition to receiving data fed from various databases administration database 102 also maintains the data. Data is imported and maintained by administration database 102 using an application such as Lotus Notes database created in Lotus Domino Designer 5.0.12. Preferably, administration database 102 is updated in real-time so as to keep the information current. However, updates can occur periodically or at user defined times, and still be within the scope of the invention.

After the data has been imported and categorized HTTP server 101 imports the information stored in administration database 102 in a conventional flat file data format or native format and stored in a file on the HTTP server's data storage 104 which serves as the source of data for the Flash movie component 106.

Data stored in data storage 104 is read by the Flash movie component 106 which converts the data into a Flash media file. The Flash file is linked through IPM HTML link 108 and made accessible to a user on Web browser 110.

Figure 5:
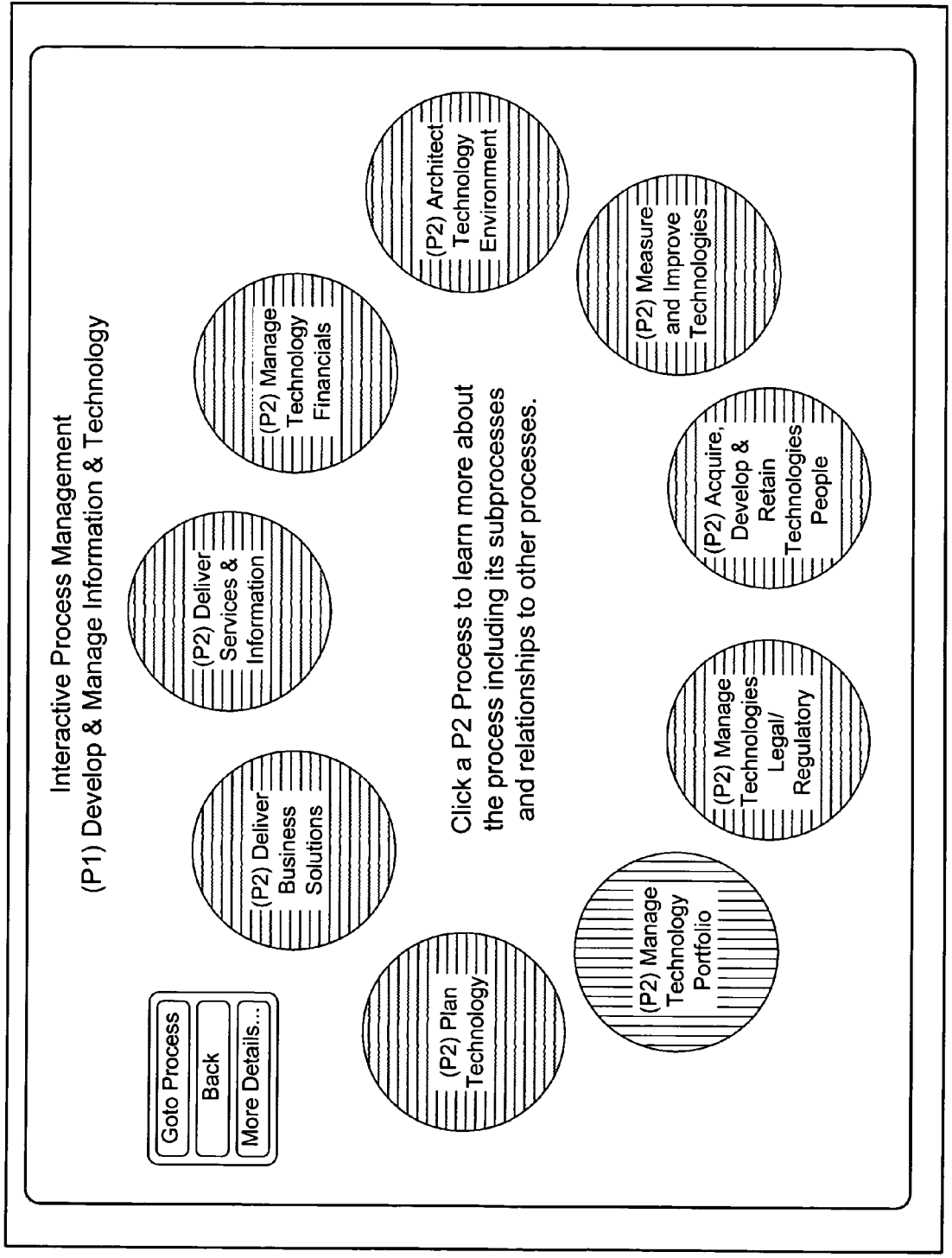
FIGS. 5 and 6 are exemplary window or screen shots generated by the graphical user interface of the present invention.
Figure 6:
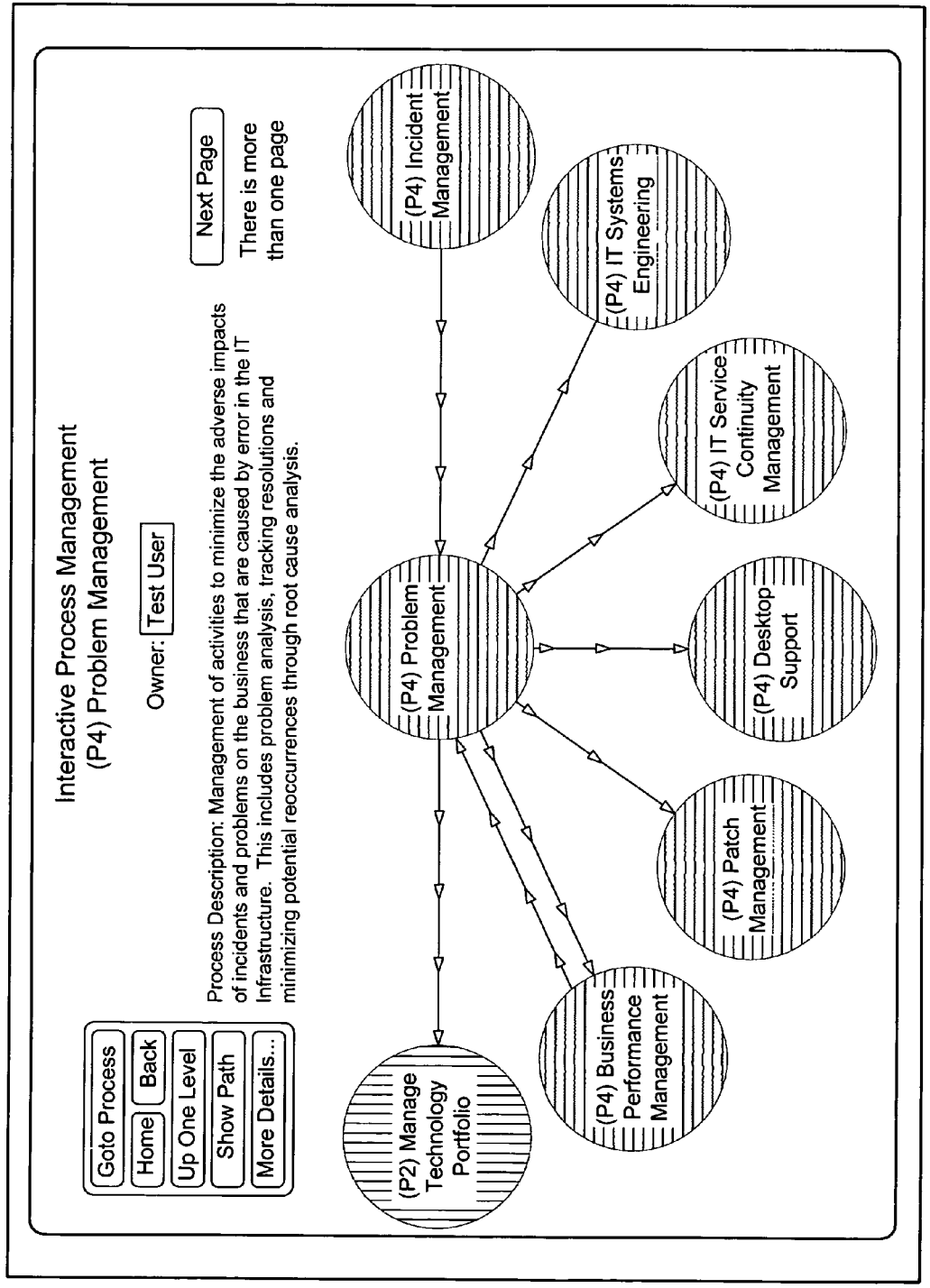

FIGS. 5 and 6 are exemplary windows or screen shots generated by the graphical user interface of the present invention upon linking to IPM HTML link 108. This link connects Web browser 110 to the Flash file. The Flash file contains the information necessary to interactively view the process controls and related information, where all of the data housed within the Flash file is stored in data storage 104. Some files, however, are more conveniently accessed using other software applications. Or, it may be the case that a file fed from the administration database 102 cannot be converted into a Flash file by the Flash movie component 106. This may be the case when the file contains embedded functionality such as Microsoft's Visual Basic. Further, it may be the case where such files are relevant to the system architecture, but not necessarily related to the process controls. Examples of such files include help files and documents, supporting images, and other additional documents relating to the architecture itself. The present invention stores such additional information (i.e., that has not been converted by the Flash movie creator 106) in storage 122 and interactively displays this information through IPM HTML link 108 using JavaScript component scripts. Such additional information, for example, includes documents relating to processes (referred to in FIG. 1 as Process "Additional Information" Documents), IPM Help Java scripts or documents, basic program information (e.g., "About IPM"), images (e.g., "Supporting Images"), and the like. The JavaScript component executed when connected to IPM HTML link 108 also is used to accept user selections from Web Browser 110 to access such additional information. While the additional information is depicted in FIG. 1 as being stored on the HTTP server 101 in storage 122, such information can also be located in storage external to HTTP server 101 or in data storage 104. If necessary, Web browser 110 is directed to the appropriate location and application for viewing it.

III. Process

As described above, the user interface is through Web browser 110. Once a connected to the Flash file through the IPM HTML link 108, the user has a visual representation of the process controls stored on the server's data storage 104. Process "Additional Information" documents, help files and documents, Web page links and images stored in storage 122 are also shown on the Web browser 110 through the IPM HTML link 108. Preferably, this additional information is based on open standard applications that can be viewed through any standard browser.

Figure 2:
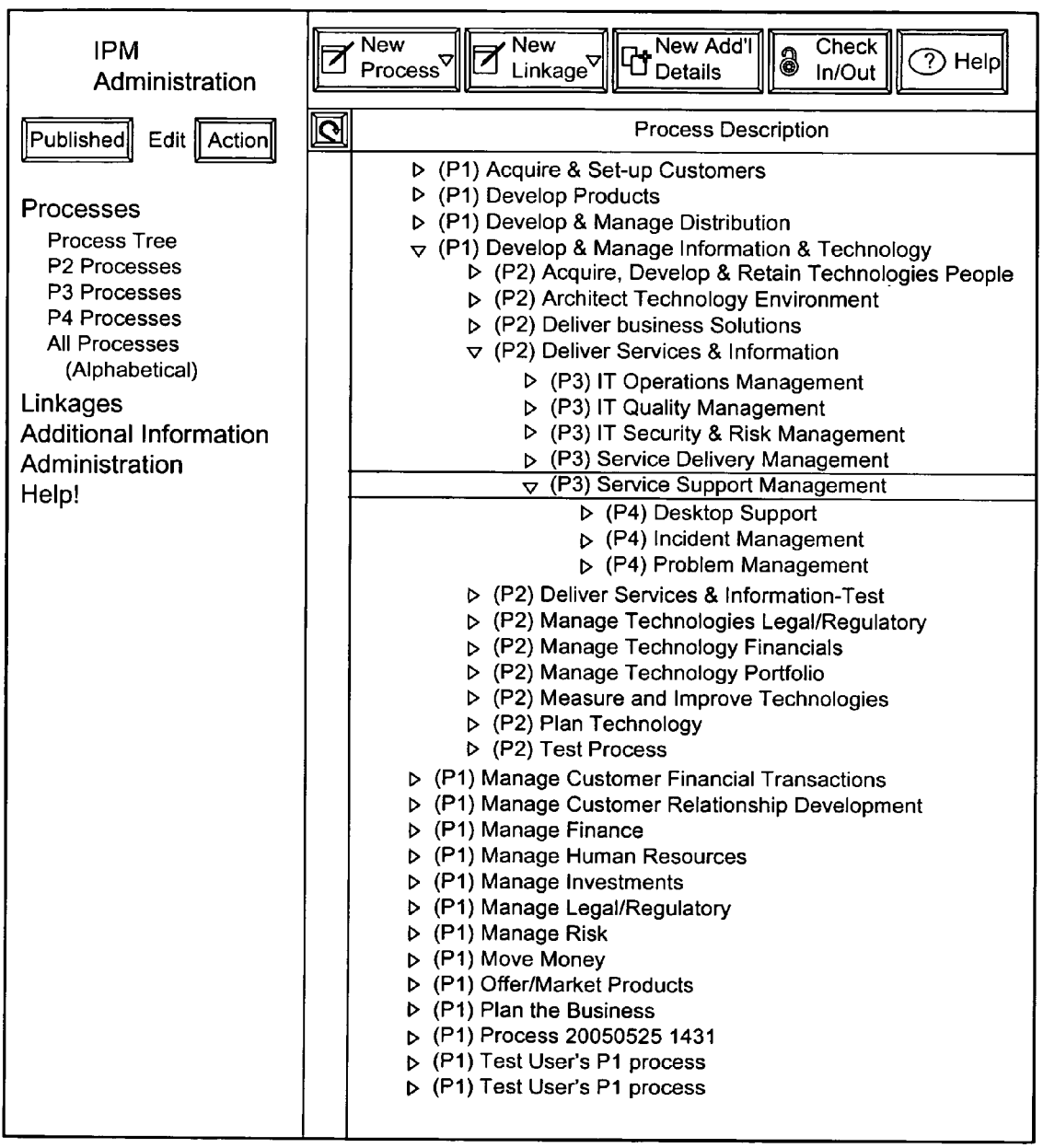
FIG. 2 is an exemplary window or screenshot of an administration interface showing an exemplary list of processes and process descriptions capable of being managed, and selections for adding new processes, linkages and additional information, according to one embodiment of the present invention.

The present invention provides intuitive process detail maintenance and the maintenance interface allows ease of process change management. A maintenance team can easily update all process specifications, process linkage overviews and process linkage details within the interface of administration database 102. FIG. 2 shows an exemplary window or screenshot of an exemplary list of processes and process descriptions capable of being edited and viewed including process leaders, contacts, process names, dependencies, color coding and document linkages.

Generally, process owners, stewards, and process team members (preferably added to a process document specific authorized editors list) access the maintenance database, which opens the specific process record, process linkage, and additional information records in the database. Modifications can be made or new process specific documents can be created. Once the authorized user has made changes or created a new document and has saved it, a version control document is created in the maintenance database. The database sends a notification email to a reviewer, who subsequently can review the change(s) or addition(s), verifying if necessary that such modifications have been approved.

If the modifications or a new document is approved, the version control document replaces the production document. If rejected, the requestor/creator of the change is notified with comments. Changes to production data in the maintenance database are then uploaded to the interactive process model.

As explained above, administration database 102 is fed data from various sources using an application such as Lotus Notes database, which is then exported to data storage 104 on HTTP server 101. The details of the data, such as process level, owner, linkages, and the like is entered upon import to administrator database 102.

FIG. 2 is a window or screenshot for maintaining existing and adding new processes, linkages and additional information.

Figure 3A:
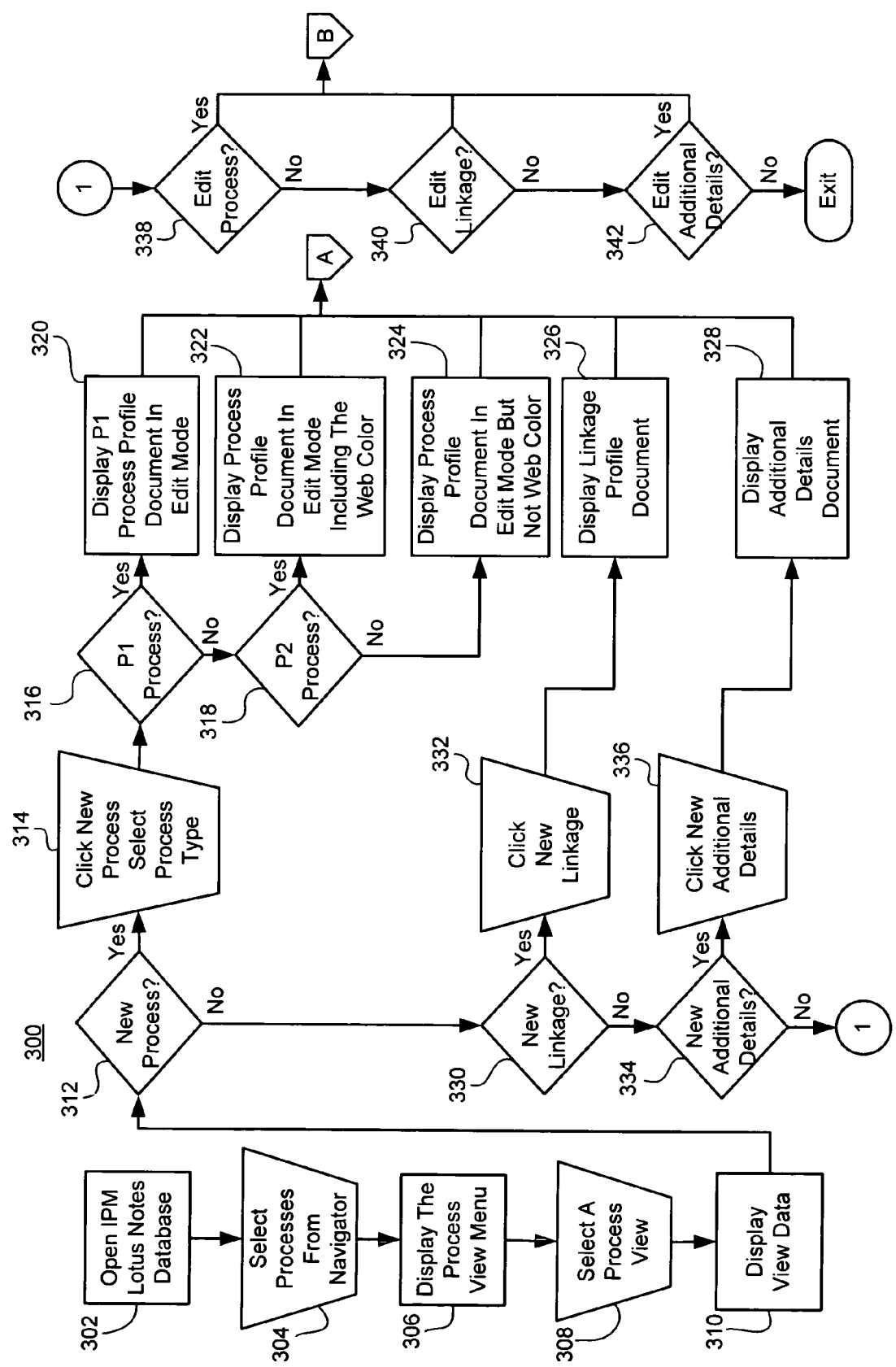
FIGS. 3a to 3c are flowcharts illustrating a maintenance process flow according to one embodiment of the present invention.

Referring to FIG. 3A, process 300 illustrates a flowchart for adding and modifying processes, linkages and additional information in accordance with one embodiment of the present invention. Maintenance of the administration database 102 occurs using its application interface (e.g., Lotus Notes database application).

Process 300 begins at step 302 when the user selects "Processes" from the Web browser 110 thereby executing the administration database application. Once open, the user selects a process from the database application software navigator as shown at step 304. At step 306, a menu of processes is displayed as shown in FIG. 2. The user selects a particular process to view at step 308 after which the process controls relating to the selected process are displayed, as shown at step 310.

New processes are created by selecting "New Process" on the screen shown in FIG. 2. If a determination is made at step 312 that the user has selected to create a new process, then at step 314 the user selects the process type they wish to add, either level P1 at step 316 or level P2 at Step 318. The corresponding process profile document in edit mode is then displayed, as illustrated in step 320 for a P1 process and step 322 for a P2 process. At step 324 if neither a P1 or P2 process was selected, a process profile document is displayed in edit mode with which a new type of process can be created and added. The present invention also provides a color palette for coloring families of related processes. When a new process is added, the user can choose the color for that process.

Process linkages can be added by selecting "New Linkage" on the screen shown in FIG. 2. A determination is made at step 330 whether a new linkage is to be added. The user then selects the linkage to be added at step 332 after which a linkage profile document is displayed, as shown a step 326.

Additional details related to the processes, such as Excel spreadsheets, documents, images, and the like) can be added by selecting the "New Add'l Details" button on the screen shown in FIG. 2. A determination is made at step 334 whether the user has made a request to add such additional details. If so, the user chooses the appropriate category of additional details at step 336. An additional details document is then displayed for the user to fill in as shown at step 337.

Figure 3B:
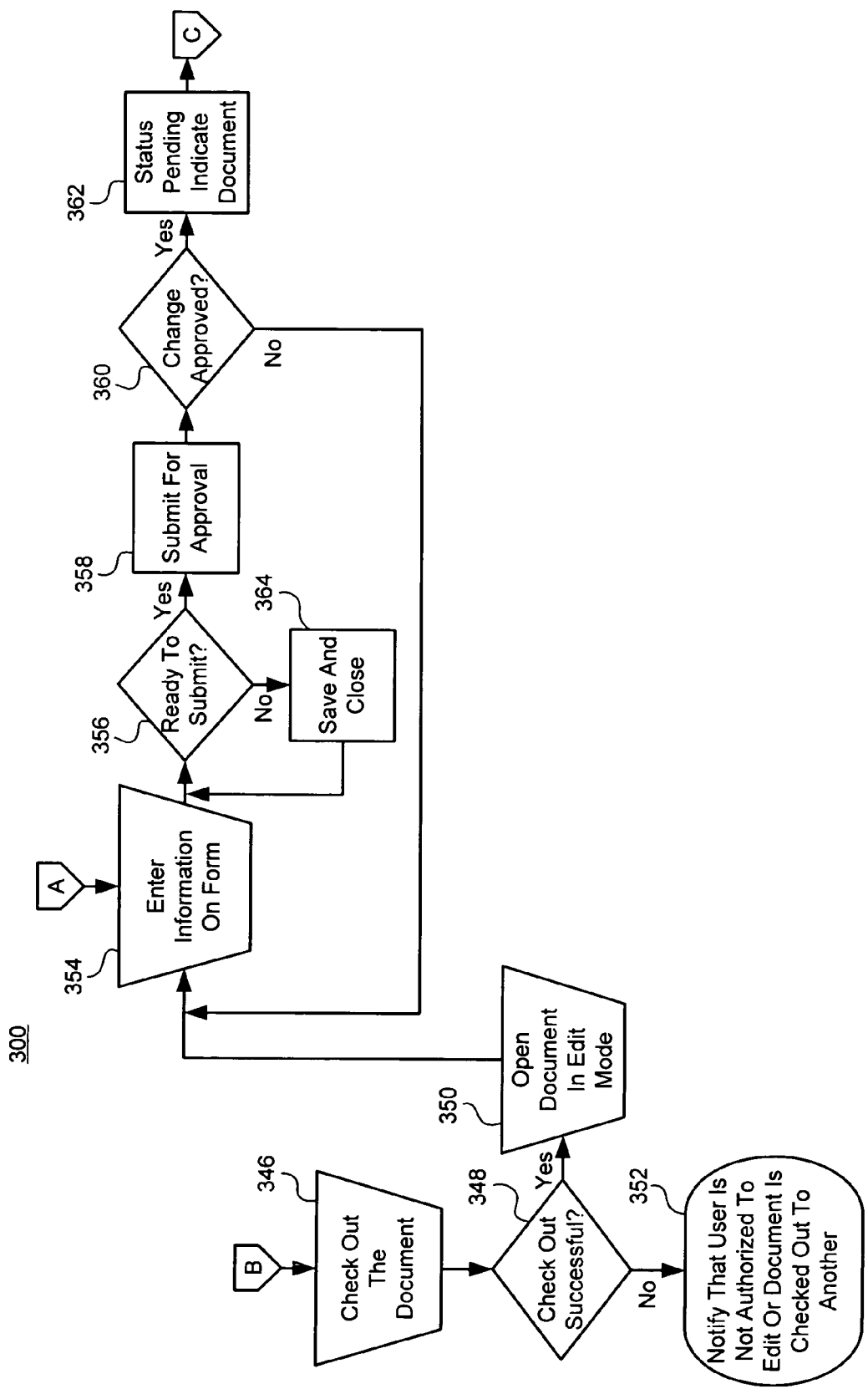

Referring to FIG. 3B, if a new process, linkage or additional information is added, then at step 354, the user inputs information relevant to the new process, linkage or additional information into a form. If a determination at step 356 is made that the form is ready to submit, then at step 364 the form is compiled into a document and at step 358 submitted for approval to a governing body or individual who approve changes to the administration database 102 data. Otherwise, a user can save the information entered thus far and close the form file for access later.

Referring back to FIG. 3A, process 300 also illustrates a routine for editing previously stored processes, linkages or additional details. If determinations are made at steps 312, 330 and 334 that a new process, linkage or additional information are not to be added, then a determination is made at step 338 whether a preexisting process is to be edited. If not, a determination is made at step 340 if a linkage is to be edited. If not, then a determination is made at step 342 if additional details are to be edited.

Referring to FIG. 3B, when an existing process, linkage or additional information document is edited, at step 346 a corresponding document is first checked out by selecting the "Check In/Out" button shown in FIG. 2. If at step 348 a determination is made that the check out of that document is successful, then the document is opened in edit mode. If a determination is made at step 348 that the document has not been checked out successful, then the user is not authorized to edit or check out the document and notified as such.

The present invention also provides a color palette for coloring related families of processes when a process is edited. This is performed in the same manner as discussed above with respect to creating a new process. In particular, the user chooses a color for that process when editing the form documents corresponding to the edited process.

At step 354, the user inputs changes to an existing process, linkage or additional information into a form. For example, if a user wishes to modify an existing process description (see e.g., FIG. 6, "Process Description"), a file corresponding to that process is opened and the user is able to modify the description. If a determination at step 356 is made that the form is ready to submit, then at step 364 the form is compiled into the checked out document and at step 358 submitted for approval by a governing body or individual that approves changes to the data. Otherwise, a user can save the document as it stands and close it for access later.

Once the information has been submitted for approval, one or more designated approvers receive an electronic communication (e.g., e-mail) that a new or modified process, linkage or additional information is ready for approval. If a determination is made at step 360 that the new form is approved then at step 362, the status of the new submission is indicated as pending until published. In one embodiment of the present invention approval is accomplished by electronically communicating documents that need approval to the designated approver(s), who can open each document and review it. If the document is rejected, an e-mail is sent to the originator of the submission explaining why the document was rejected. If it is approved, then the document is transmitted to a publishing queue as shown at step 362.

Figure 3C:
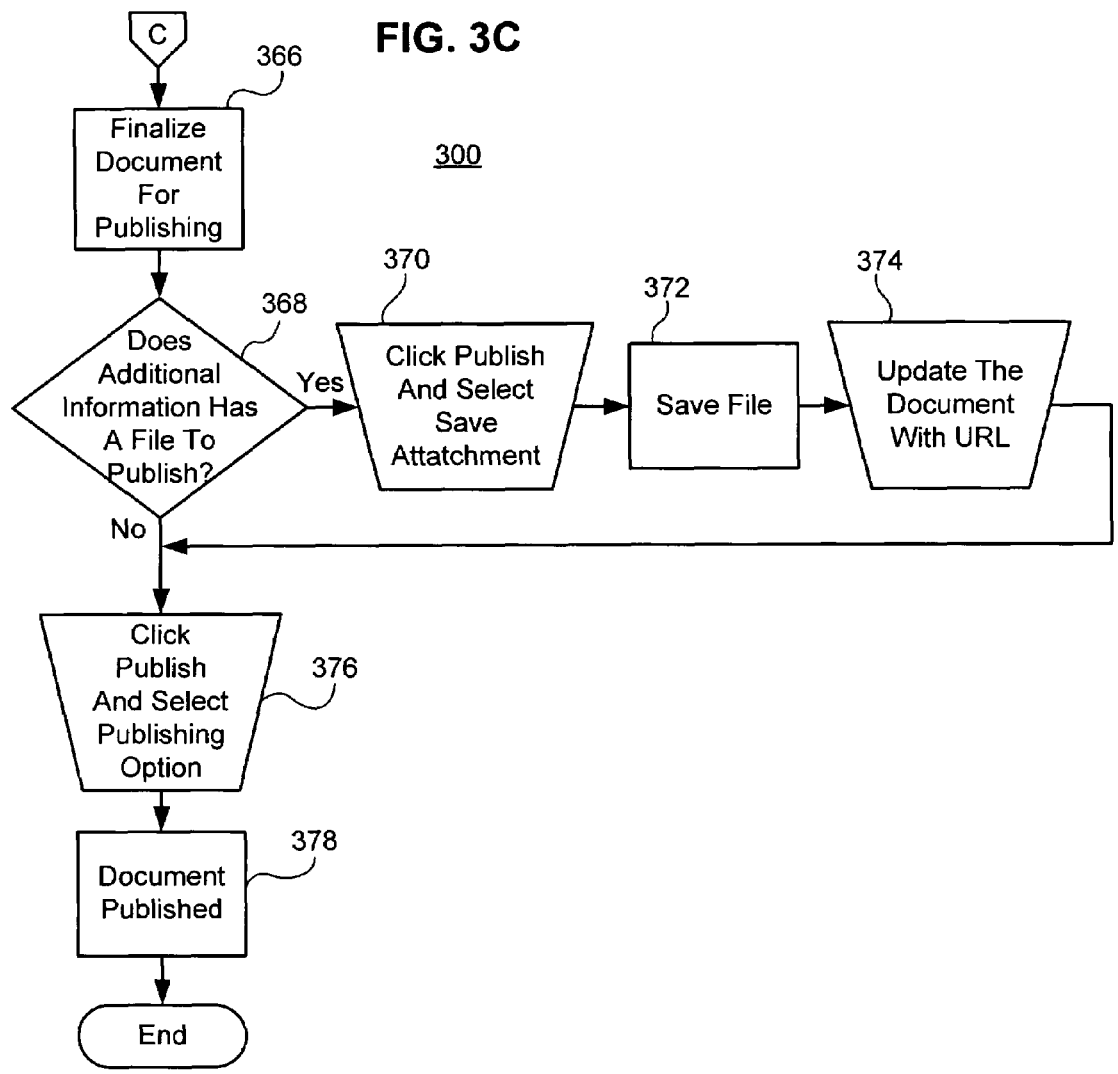

Referring to FIG. 3C, after the document is placed into the publishing queue and is ready to publish as shown at step 366, a determination is made at step 368 whether additional information associated with the process includes a file to publish. If so, then the user publishes and saves the document including the details of the process, as shown at step 370. At step 372, the file (e.g., additional information) is saved and at step 374, the document is updated and linked with a URL to become accessible by a user on Web browser 110 through IPM HTML link 108.

The publishing process is on the entire collection of documents that have been approved, including having additional files published, if necessary. The publishing process is initiated from action buttons in a view. All views on the "Edit" and "Action" tabs (see FIG. 2) include the publish actions. In particular, there are two steps to publishing. The approved documents can be published and then the Flash data can be published.

If the approved documents are to be published, the changes to the published documents on the database (e.g., Lotus Notes database) are made in such manner that the documents cannot be edited without permission. If a user publishes the Flash data, the data from the published documents are used to create the data file in data storage 104 that is read by IPM Flash movie component 106.

When documents are ready to be published, a user (or "publisher") selects "Publish" (not shown) and then selects "Publish Approved Documents" (not shown). Upon initiating the publishing process, a dialog of the current action and status can be displayed. Any publishing errors are logged.

If the publisher chooses "Publish" (not shown) and then "Flash Data" (not shown), then a file is stored on data storage 104 to be read by the IPM Flash movie component 106.

If a determination is made at step 368 that additional information does not have a file to publish, then at step 376, the publisher publishes the document. Subsequently, at step 378, the document is published.

FIGS. 5 and 6 are exemplary window or screen shots generated by the graphical user interface (e.g., Flash file played on Web browser 110) of the present invention. The menu interface of the present invention is dynamic in that it guides the user through the available process information as the user walks through the decomposition. Since processes are presented through a parent-child relationship, beginning at the highest level process, authorized users are able to quickly drill down into increasingly detailed process information such as process definition, ownership, linkages, process scorecards, integrated line of visibility process models, Critical to Quality (CT) trees, end-to-end process maps for compliance with Sarbanes-Oxley section 404, and the like. The dynamic menu is created based upon available data real time. The administration database entries described above drive the interface.

Thus, no menu maintenance is required once the data has been imported from administration database 102.

The present invention provides a management infrastructure that links various process controls together without the need for performing heuristics or modeling steps. In addition, users can analyze a process from various perspective so full process maps (i.e., level 1 to any level n or P1-Pn) can be viewed in the native format. Further, process rework loops are provided, which may introduce potential savings. This is made possible by providing an infrastructure which calls out to process maps to get the inner workings of a process thereby identifying opportunities for improvement. Advantageously, the present invention can call an improvement database, which can track any project, accept input and serve as an analysis tool for understanding process improvement opportunities.

Referring again to FIG. 5, from an intranet, a user at Web browser 110 launches a Web page linked to HTTP server 101 Host HTML link 112. Processes are described as being of a "P" level, "P" standing for Portfolio. The larger the "P" number, the more detailed the information on the process. The solution opens to the highest-level process, which in this case is depicted as the P1 level or Home page.

Pressing the left button on a computer mouse causes a menu of options to appear. In the upper window, a listing of the P2 processes available to choose from is displayed. Selecting one of the P2 processes and selecting the "Go" button (not shown) will allow a user to drill down into more detail about that Process.

A listing of all processes of a particular "P" level can be displayed. Selecting one of the processes in this window, displays another menu which allows a user to view the definition page for the process. Definition pages are explained in more detail below.

After selecting a P2 process from the Home page depicted in FIG. 5, or from the menu (e.g. "Go to Process") the user will be displayed a P2 definition page. The P2 definition page identifies the name of the process, the process owner, process definition, and the like, and displays a list of P3 processes that comprise that P2 process.

A user can continue to drill down to lower level processes (e.g. P3, P4, etc.) in the same way. As discussed above, additional process information is uploaded to the intranet server as a part of the maintenance cycle. When the process raw data is uploaded, entries are added or removed to the process specific "More Detail" menu. When a user selects an item on that menu, and process "Go" the document is displayed, or the appropriate application to view/access the document is launched, and the document displayed. Again, the menu function allows a user to move to the definition page of any process. The P3 process definition is displayed as well.

Referring now to FIG. 6, to display linkages, a user selects the "More Details" button. Then from the more details dialog, the user selects "Linkages" (not shown) and then the "Go" button (not shown). Processes that the P4 process has linkages will then be communicated to the user. The linked processes can be color coded to match the color coding used for P2 Processes (depicted our hatch marks in FIGS. 5 and 6). Using consistent coloring of processes from the high level P2 Process to the detailed P4 and P5 processes allows users to easily recognize process relationships.

The arrows connecting the linked processes can be animated, showing the directional flow of the linkage, out, in, or bidirectional. If more process linkages exist than can be displayed at one time, in the lower right corner of the view, a comment appears with links to view second or third pages of linkages.

To obtain more information on how the processes are linked, a user moves the cursor over the linked process (i.e., over an arrow). When the curser is over the linked processes it becomes a pointing finger. If the user then selects (e.g., "clicks") the arrow a text box appears, providing detail on process linkage.

From the P4 process definition users can also select the further detail button by selecting it. When the "More Detail" button is selected a list of further processes specific information is made available. Users can choose to view the Critical to Quality process tree for the process, End-to-End Process view, Line of Visibility model for the process, or access the process score card. This is done by selecting, or highlighting one of the options, and selecting the "Go" button (not shown).

If a user, from the further detail menu selects a process control such as a Critical to Quality Tree ("CT") for a process, the CT diagram for the process is displayed. Critical to Quality Trees are a powerful analytical tool used by Six Sigma and other quality management methodologies. The Critical to Quality tree helps like quality aspects of a product or service to a process and translate broad Customer requirements into specific critical to quality requirements of the process.

If a user, from the further detail menu selects another process control such as a Line of Visibility Model for the process, the Line of Visibility Diagram for the process is displayed. Line of Visibility models are similar to process maps, but are focused much less on activities within the process, and more on the hand-offs within a process, and to whom a hand-off occurs. The diagrams are a strong relationship to process linkages because those hand offs represent linkages.

By selecting "Show Path", the user can view the hierarchical decomposition of the process currently being studied. The process that is currently being studied may not have been reached through a hierarchical pathway. It may have been reached through different linkages. For example, problem management might have reached the currently viewed process through different business solutions (e.g., a different P2 processes). In such a case the user may not clearly understand a process's current relation relative to the entire model. The "Show Path" function allows the user to view the hierarchical relationship back to the initial level P1 process.

If a user, from the further detail menu selects Process Scorecard process control, the Six Sigma Process Management Scorecard for the process is displayed. The Six Sigma Process Management Score card, displays how a process is performing. By maintaining an updated repository of interrelated process controls, the present invention allows process owners to understand the health of their process. Metrics captured from the process are also used to calculate a sigma score. Process linkages into and out of a process are often key points in the process where metrics can be accurately measured. Those process linkages coming into the process represent leading process indicators, and those leading out of the process form in process or lagging process metrics.

IV. Example Implementations

The present invention (i.e., system 100, process 200 or any part(s) or function(s) thereof) may be implemented using hardware, software or a combination thereof and may be implemented in one or more computer systems or other processing systems. Useful machines for performing the operation of the present invention include general purpose digital computers or similar devices.

Figure 7:
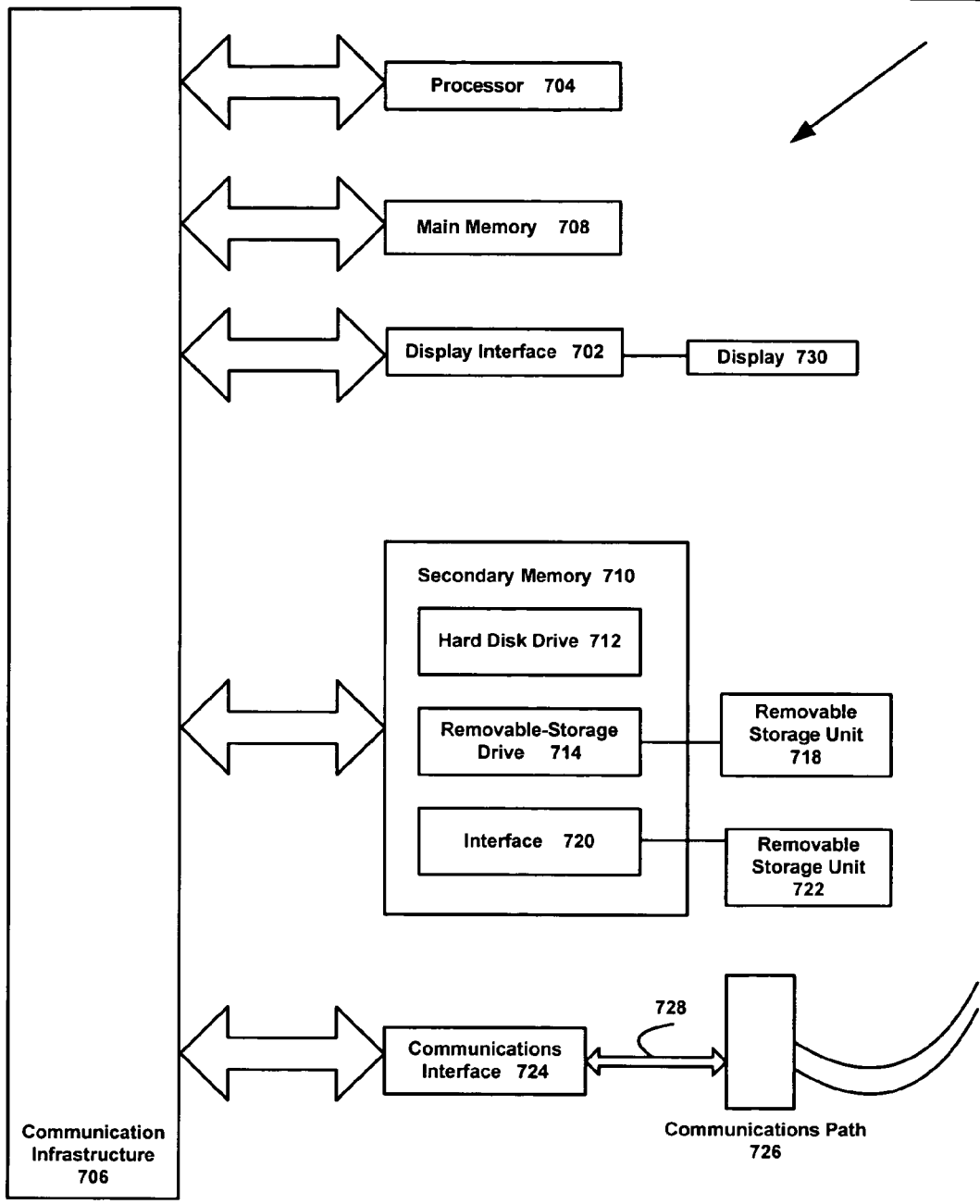
FIG. 7 is an exemplary computer system useful for implementing the present invention.

In fact, in one embodiment, the invention is directed toward one or more computer systems capable of carrying out the functionality described herein. An example of a computer system 700 is shown in FIG. 7.

The computer system 700 includes one or more processors, such as processor 704. The processor 704 is connected to a communication infrastructure 706 (e.g., a communications bus, cross-over bar, or network). Various software embodiments are described in terms of this exemplary computer system. After reading this description, it will become apparent to a person skilled in the relevant art(s) how to implement the invention using other computer systems and/or architectures.

Computer system 700 can include a display interface 702 that forwards graphics, text, and other data from the communication infrastructure 706 (or from a frame buffer not shown) for display on the display unit 730.

Computer system 700 also includes a main memory 708, preferably random access memory (RAM), and may also include a secondary memory 710. The secondary memory 710 may include, for example, a hard disk drive 712 and/or a removable storage drive 714, representing a floppy disk drive, a magnetic tape drive, an optical disk drive, etc. The removable storage drive 714 reads from and/or writes to a removable storage unit 718 in a well known manner. Removable storage unit 718 represents a floppy disk, magnetic tape, optical disk, etc. which is read by and written to by removable storage drive 714. As will be appreciated, the removable storage unit 718 includes a computer usable storage medium having stored therein computer software and/or data.

In alternative embodiments, secondary memory 710 may include other similar devices for allowing computer programs or other instructions to be loaded into computer system 700. Such devices may include, for example, a removable storage unit 722 and an interface 720. Examples of such may include a program cartridge and cartridge interface (such as that found in video game devices), a removable memory chip (such as an erasable programmable read only memory (EPROM), or programmable read only memory (PROM)) and associated socket, and other removable storage units 722 and interfaces 720, which allow software and data to be transferred from the removable storage unit 722 to computer system 700.

Computer system 700 may also include a communications interface 724. Communications interface 724 allows software and data to be transferred between computer system 700 and external devices. Examples of communications interface 724 may include a modem, a network interface (such as an Ethernet card), a communications port, a Personal Computer Memory Card International Association (PCMCIA) slot and card, etc. Software and data transferred via communications interface 724 are in the form of signals 728 which may be electronic, electromagnetic, optical or other signals capable of being received by communications interface 724. These signals 728 are provided to communications interface 724 via a communications path (e.g., channel) 726. This channel 726 carries signals 728 and may be implemented using wire or cable, fiber optics, a telephone line, a cellular link, a radio frequency (RF) link and other communications channels.

In this document, the terms "computer program medium" and "computer usable medium" are used to generally refer to media such as removable storage drive 714, a hard disk installed in hard disk drive 712, and signals 728. These computer program products provide software to computer system 700. The invention is directed to such computer program products.

Computer programs (also referred to as computer control logic) are stored in main memory 708 and/or secondary memory 710. Computer programs may also be received via communications interface 724. Such computer programs, when executed, enable the computer system 700 to perform the features of the present invention, as discussed herein. In particular, the computer programs, when executed, enable the processor 704 to perform the features of the present invention. Accordingly, such computer programs represent controllers of the computer system 700.

In an embodiment where the invention is implemented using software, the software may be stored in a computer program product and loaded into computer system 700 using removable storage drive 714, hard drive 712 or communications interface 724. The control logic (software), when executed by the processor 704, causes the processor 704 to perform the functions of the invention as described herein.

In another embodiment, the invention is implemented primarily in hardware using, for example, hardware components such as application specific integrated circuits (ASICs). Implementation of the hardware state machine so as to perform the functions described herein will be apparent to persons skilled in the relevant art(s).

In yet another embodiment, the invention is implemented using a combination of both hardware and software.

V. Conclusion

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way. It is also to be understood that the steps and processes recited in the claims need not be performed in the order presented.

What is claimed is:

1. A method for supplying information relating to a hierarchical structure of a plurality of process models, comprising the steps of:
    (a) storing at least one process control for each of the plurality of process models;
    (b) associating the process controls with corresponding ones of the process controls; and
    (c) creating a media file adapted to depict, at the direction of a user, a plurality of relational linkages of the plurality of process models based on the association of the process controls, the creating including:
        importing a file corresponding respectively to each process control, and
        converting each file obtained by the importing to a format of the media file.

2. A method according to claim 1, wherein each process control is comprised of at least one metric.

3. A method according to claim 1, further comprising the step of:
(d) determining whether each process control has been approved; and
(e) publishing the media file if the process control has been approved.

4. The method of claim 1, further comprising the step of:
(d) communicating, at the direction of the user, the plurality of process controls, wherein the plurality of process controls comprises at least one of a scorecard, a line of visibility model, a process map, a critical to quality tree, a scorecard, a report and a linkage to additional information relating to a process model.

5. The method of claim 1, further comprising the steps of:
(d) storing additional data relating to the process controls; and
(e) communicating, at the direction of the user, the additional data relating to the process model.

6. A system for supplying information relating to a hierarchical structure of a plurality of process models comprising:
a storage unit operable to store at least one process control for each of the plurality of process models;
a processor operable to associate the process controls with corresponding ones of the process controls; and
a media file creator operable to import a file corresponding respectively to each process control, convert each imported file to a format of the media file, and create a media file adapted to depict, at the direction of a user, a plurality of relational linkages of the plurality of process models based on the association of the process controls.

7. The system according to claim 6, wherein each process control is comprised of at least one metric.

8. The system according to claim 6, further comprising:
an approval unit operable to determine whether each process control has been approved; and
a publishing unit operable to publish the media file if the process control has been approved.

9. The system of claim 6, further comprising:
an interface constructed to communicate at the direction of a user the plurality of process controls, wherein the plurality of process controls comprises at least one of a scorecard, a line of visibility model, a process map, a critical to quality tree, a scorecard, a report and a linkage to additional information relating to a process model.

10. The system of claim 6, further comprising:
another storage unit operable to store additional data relating to the process controls; and
the processor further operable to communicate, at the direction of the user, the additional data relating to the process model.

11. A computer program product comprising a computer usable medium having control logic stored therein for causing a computer to supply information relating to a hierarchical structure of a plurality of process models, said control logic comprising:
first computer readable program code for causing the computer to store at least one process control for each of the plurality of process models;
second computer readable program code for causing the computer to associate the process controls with corresponding ones of the process controls; and
third computer readable program code for causing the computer to create a media file adapted to depict, at the direction of a user, a plurality of relational linkages of the plurality of process models based on the association of the process controls, the third computer readable readable program code including:
code for causing the computer to import a file corresponding respectively to each process control, and
code for causing the computer to convert each file obtained by the code for causing the computer to import to a format of the media file.

12. The computer program product of claim 11, wherein each process control is comprised of at least one metric.

13. The computer program product of claim 11, further comprising:
fourth computer readable program code for causing the computer to determine whether each process control has been approved; and
fifth computer readable program code for causing the computer to publish the media file if the process control has been approved.

14. The computer program product of claim 11, further comprising:
fourth computer readable program code for causing the computer to communicate at the direction of a user the plurality of process controls, wherein the plurality of process controls comprises at least one of a scorecard, a line of visibility models, a process map, a critical to quality tree, a scorecard, a report and a linkage to additional information relating to a process model.

15. The computer program product of claim 11, further comprising:
fourth computer readable program code for causing the computer to store additional data relating to the process controls; and
fifth computer readable program code for causing the computer to communicate, at the direction of the user, the additional data relating to the process model.

* * * * *

UNITED STATES PATENT AND TRADEMARK OFFICE
CERTIFICATE OF CORRECTION

PATENT NO. : 7,512,451 B2
APPLICATION NO. : 11/231257
DATED : March 31, 2009
INVENTOR(S) : Wayne E. Detzler et al.

It is certified that error appears in the above-identified patent and that said Letters Patent is hereby corrected as shown below:

SHEET 1

Figure 1, "Maromedia" should read --Macromedia--.

SHEET 3

Figure 3A, "IPM" should read --IBM--.

SHEET 5

Figure 3C, "Attatchment" should read --Attachment--; and "information Has" should read --Information Have--.

COLUMN 1

Line 7, "application claim" should read --application claims--; and
    Line 24, "Heretofor," should read --Heretofore,--.

COLUMN 2

Line 29, "to increases" should read --to increase--.

COLUMN 3

Line 17, "depicted" should read --depicting--; and
    Line 19, "process" should be deleted.

COLUMN 5

Line 1, "IfHTTP" should read --If HTTP--; and
    Line 12, "databases" should read --databases,--.

COLUMN 6

Line 3, "Once a connected" should read --Once connected--; and
    Line 43, "is entered" should read --are entered--.

COLUMN 7

Line 13, "as shown a step" should read --as shown at step--;
Line 15, "the like)" should read --the like,--;
Line 48, "successful," should read --successfully,--; and
Line 49, "notified" should read --is notified--.

COLUMN 9

Line 55, "Processes that" should read --Processes with which--;
Line 58, "Processes (depicted our" should read --processes (depicted as--; and
Line 59, "Pro-" should read --pro- --.

COLUMN 10

Line 8, "button by selecting it." should read --button.--;
Line 20, "tree" should read --Tree--; and "like" should read --link--;
Line 30, "hand offs" should read --hand-offs--;
Line 39, "processes)." should read --process.)--; and
Line 46, "Score card," should read --Scorecard--.

COLUMN 13

Line 4, "step" should read --steps--.

Signed and Sealed this

Fifth Day of January, 2010

David J. Kappos
*Director of the United States Patent and Trademark Office*